(12) United States Patent
Yu et al.

(10) Patent No.: US 10,515,236 B1
(45) Date of Patent: Dec. 24, 2019

(54) DATA RETENTION DEVICE

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 0 days.

(21) Appl. No.: 16/276,691

(22) Filed: Feb. 15, 2019

(30) Foreign Application Priority Data

Dec. 18, 2018 (TW) .............................. 107145630 A

(51) Int. Cl.
*H05K 5/00* (2006.01)
*H05K 7/00* (2006.01)
*G06F 21/88* (2013.01)
*G06F 21/60* (2013.01)
*G06F 21/86* (2013.01)

(52) U.S. Cl.
CPC ............ *G06F 21/88* (2013.01); *G06F 21/602* (2013.01); *G06F 21/86* (2013.01)

(58) Field of Classification Search
CPC ....................................................... H05K 5/00
See application file for complete search history.

(56) References Cited

U.S. PATENT DOCUMENTS

| 2012/0182683 | A1* | 7/2012 | Schwandt | ............ | G02B 6/4292 |
| | | | | | 361/679.31 |
| 2018/0279491 | A1* | 9/2018 | Yasui | ................... | H05K 5/0026 |

* cited by examiner

*Primary Examiner* — Jerry Wu
(74) *Attorney, Agent, or Firm* — Bacon & Thomas, PLLC

(57) ABSTRACT

The present disclosure relates to a data retention device designed for security of digital classified information. In the data retention device, a power source component is first activated by a fingerprint switch. When a data plug of a dedicated storage module and a data socket of an encryption module are connected with each other, a locking element in the encryption module is fixed at a locking hole in the dedicated storage module and the encryption module is electrically connected to the dedicated storage module through the data socket. Then, with an external component of the encryption module electrically connected to an external device, classified information is accessed, encrypted in the encryption module and saved in the storage element.

7 Claims, 8 Drawing Sheets

DATA RETENTION DEVICE

BACKGROUND OF THE INVENTION

1) Field of the Invention

The present disclosure relates to a data retention device for encryption of data, particularly a dedicated storage module saving classified information and physically removed from the data retention device, such that classified information encrypted by an encryption module is accessed from the dedicated storage module with an external component electrically connected to an external device.

2) Description of the Prior Art

When the personal cloud is widely used in a private network, centralized management is available to private storage devices gradually and centralized data management and backup is provided by independent network storage devices which are connected to the private network; however, the privacy issue of personal data is exposed correspondingly.

The patent documentations with respect to storage systems are shown as follows:

As shown in Japanese Patent JP 2002-236380, a data retention system provides data saved in a user's terminal and accessed through the internet to the user or other users such that the data are available to a plurality of terminals. For all types of terminals owned by users, the data retention system is equipped with a server comprising a unified connection interface through which a user's terminal and a service provider's data management unit are connected via the internet. Moreover, data saved in a FTP server is processed for the data retention system during data format conversion. When data/files in the data retention system are used by users through different types of terminals, the data/files should be processed during data format conversion for applications in users' terminals and further transmitted to users' terminals.

As shown in R.O.C. Patent TW 526643, a data access and control system and a method thereof rely on the secret sharing principle to divide a master key into n sub-keys which are given to n sub-key owners. Then, m sub-keys (1<m<n) are obtained by a reorganization utility of the master key based on the secret shared by sub-key owners; the master key can be reorganized according to the (m,n)-threshold programme. Finally, classified data to be accessed by the data access and control system can be encrypted or decrypted based on the master key. Accordingly, m sub-keys should be attained for reorganizing the master key before data in the data access and control system is modified or accessed; privacy and security of data in the data access and control system is guaranteed. Furthermore, when a sub-key owner left office or was transferred to another post, a sub-key owned by the sub-key owner rather than the master key is changed for reorganization of the master key and least influence on accessing ciphertexts due to change of a password.

European Patent EP 12178889.7 discloses a method to safely access a service inside a defined trustable environment. As shown in EP 12178889.7, there is at least a network component existing in the defined trustable environment and having a password saved internally. When a user device is introduced into the trustable environment, the user device will contact the network component to receive the password saved in the network component. Then, the password is transmitted to the service by the user device and checked with a matched password saved in the service for activation of the service.

However, the data privacy issue still exists. For better data privacy without the above problem, a data retention device is provided in the present disclosure.

SUMMARY OF THE INVENTION

In virtue of the above problem, a data retention device is used in encryption of data and provided with a separate dedicated storage module for better security.

A data retention device in the present disclosure relies on multiple safety precautions for promotion of data security.

A data retention device in the present disclosure is energized through a fingerprint for least classified information accessed by unrelated persons probably.

A data retention device in the present disclosure is provided with a dedicated data plug in coordination with a data outlet for no unrelated electric connection.

A data retention device in the present disclosure is provided with a locking element for supply of electric power to specific modules which are not energized by another power source directly.

A data retention device in the present disclosure is electrically connected to an external device through an external component for data exchanges between the data retention device and the external device easily.

A data retention device in the present disclosure is provided with an encryption component in coordination with a fingerprint switch to encrypt classified information and transmit classified information to a dedicated storage module.

A data retention device in the present disclosure effectuates no classified information accessed from a dedicated storage module without a corresponding fingerprint.

A data retention device in the present disclosure is provided with a cooling fin unit for better stability of encryption.

To this end, the present application adopts the following technical measures. A data retention device in the present disclosure comprises a dedicated storage module, an encryption module and a lock fastener module: the dedicated storage module comprises a data plug, a locking hole, a control element, a storage element and a substrate which is electrically connected to all components in the dedicated storage module; the encryption module comprises a data socket, an external component, an encryption component, a power source component and a printed circuit board which is electrically connected to all components in the encryption module; the lock fastener module comprises a locking element, a power element and a fingerprint switch wherein the locking element is driven and shifted to another position by the power element energized from the power source component; a data retention device is characterized that: the power source component is activated by the fingerprint switch; the encryption module is electrically connected to the dedicated storage module through the data socket when the data plug is plugged into the data socket and the locking element is fixed at the locking hole; the external component of the encryption module is electrically connected to an external device for accessing classified information which will be encrypted by the encryption component and saved in the storage element.

A data detention device in the present disclosure is further embodied according to the following technical measure.

In the data detention device, a power receiving port in the locking hole and a power supply port in the locking element are electrically connected to each other for supply of electric power to the dedicated storage module.

In the data detention device, the encryption module comprises an indicator.

In the data detention device, the encryption component encrypts a key through the fingerprint switch.

The data detention device comprises an ordinary storage device which is electrically connected to the encryption module.

The data detention device comprises an upper cover, a lower cover and a fastener module which comprises at least a footing section, a base section, a spring and a locator subassembly.

In the data detention device, the lower cover comprises a cooling fin unit.

In the data detention device, the fastener module comprises an unlocking pin.

In contrast to conventional storage devices, a data retention device in the present disclosure has following effects: (1) a specific data plug in coordination with a data socket for no unrelated electric connection; (2) components energized through a fingerprint for least classified information accessed by unrelated persons probably; (3) encrypted data and a separate dedicated storage module for better data security.

BRIEF DESCRIPTIONS OF THE DRAWINGS

DETAILED DESCRIPTIONS OF THE PREFERRED EMBODIMENTS

A data retention device is further illustrated in the preferred embodiment for clear understanding of purposes, characteristics and effects of the present disclosure.

Figure 1A:
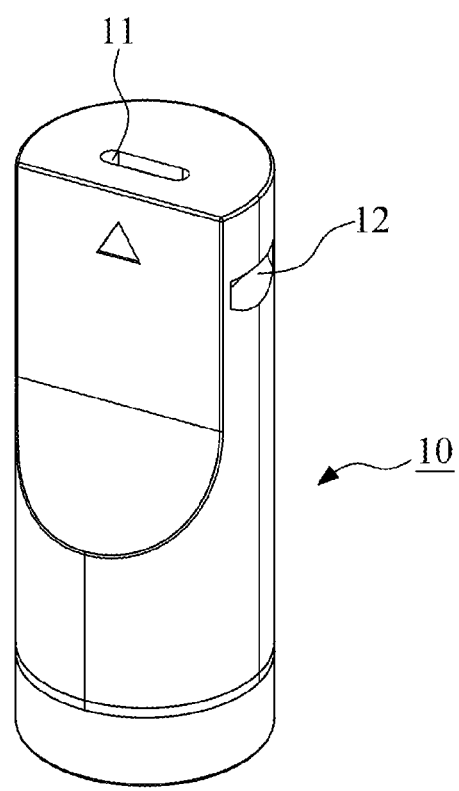
FIG. 1a is a side view of a dedicated storage module in a data retention device in a preferred embodiment.
Figure 1B:
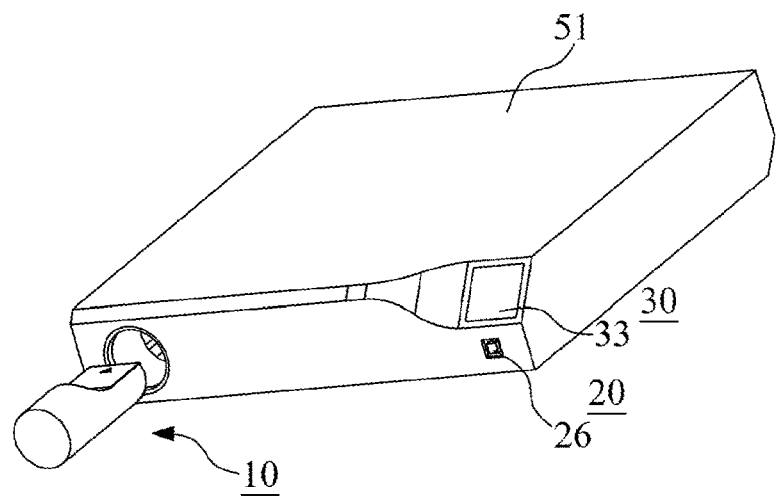
FIG. 1b is a side view for entire appearance of a data retention device in a preferred embodiment.

Referring to FIG. 1b, which illustrates a data retention device comprising a dedicated storage module (10), an encryption module (20) and a lock fastener module (30).

Figure 5A:
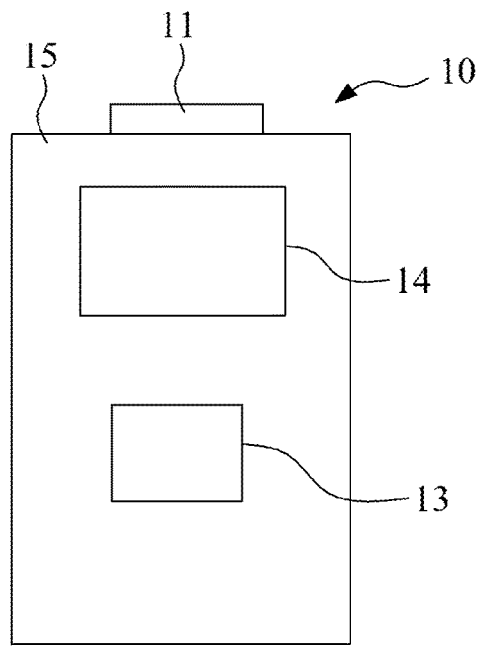
FIG. 5a is a schematic view of a dedicated storage module in a data retention device in a preferred embodiment.

As shown in FIGS. 1a and 5a, the dedicated storage module (10) comprises a data plug (11), a locking hole (12), a control element (13), a storage element (14) and a substrate (15) which is electrically connected to all components in the dedicated storage module (10).

In general, the data plug (11) which presents as a plug with an electric-contact end for specially defined physical specifications (FIG. 1a) rather than universal specifications and no electric contacts beyond designs; the locking hole (12) designed at one side of the dedicated storage module (10) (FIG. 1a) and used to fix the dedicated storage module (10) at a designated position is conductive to stability between the data plug (11) and the data socket (21); the control element (13) is a logic machine with which a complicated computer program is executed; the storage element (14) means non-volatile memories (NVRAM) in which configurations and/or data are saved but not erased after disconnection of power; the substrate (15) is a circuit board usually, for example, a single-layered or multi-layered printed circuit board, a lead frame, a polyimide, a BT circuit board or a flip chip substrate, and comprises circuits interiorly (not shown in figures) as an interface for electric transmission.

Figure 2A:
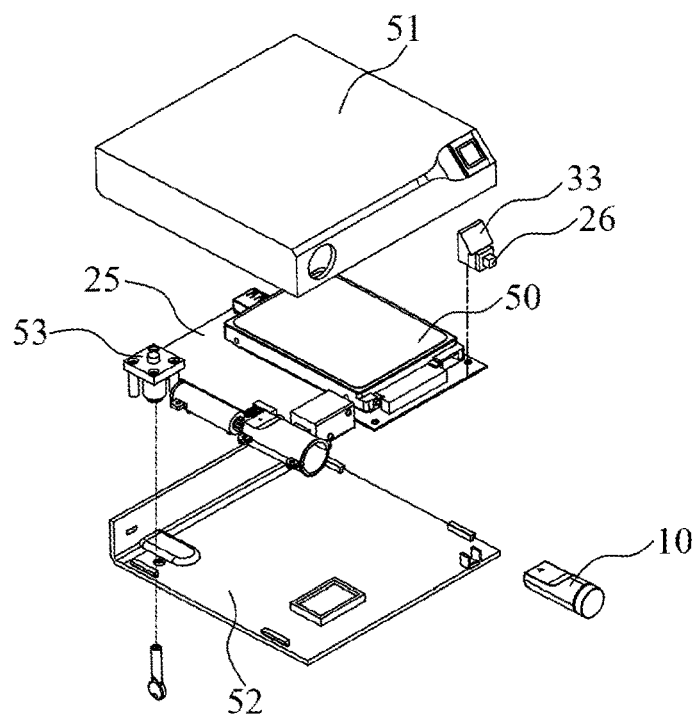
FIG. 2a is an exploded view of a data retention device in a preferred embodiment.
Figure 5B:
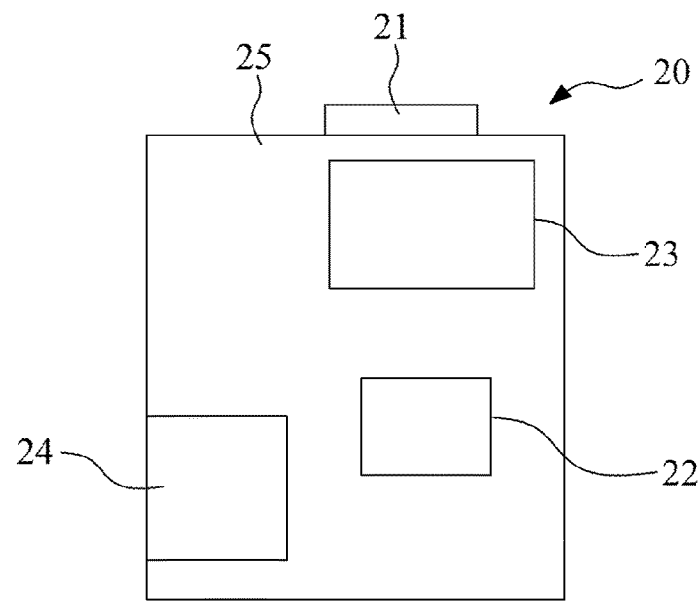
FIG. 5b is a schematic view of an encryption module in a data retention device in a preferred embodiment.

Referring to FIGS. 2a and 5b that illustrate the encryption module (20) comprising a data socket (21), an external component (22), an encryption component (23), a power source component (24) and a printed circuit board (25) which is electrically connected to all component in the encryption module (20).

Specifically, the data socket (21) which presents as a socket with an electric-contact end for specially defined physical specifications (FIG. 2c) rather than universal specifications and no electric contacts beyond designs; the external component (22) is an assembly providing a function to connect the internet, for example, network interface controller (NIC) that is wired or wireless hardware as an interface of data exchanges locally or remotely for network-based communications among different devices; the encryption component (23) in which symmetric or asymmetric algorithms are integrated internally for the high security level is also known as a security chip that prevents secret keys or data saved internally from being accessed or tampered illegally and provides the encryption module (20) with ciphered texts encrypted from plain texts and difficultly read wherein the ciphered texts should be deciphered and returned to normal readable plain texts by an authorized administrator owing a decryption key during a deciphering process; the power source component (24) which is connected to an external power source for running provides electric power to the dedicated storage module (10), the encryption module (20) and the lock fastener module (30); the printed circuit board (25) is a circuit board usually, for example, a single-layered or multi-layered printed circuit board, a lead frame, a polyimide, a BT circuit board or a flip chip substrate, and comprises circuits interiorly (not shown in figures) as an interface for electric transmission.

Figure 2B:
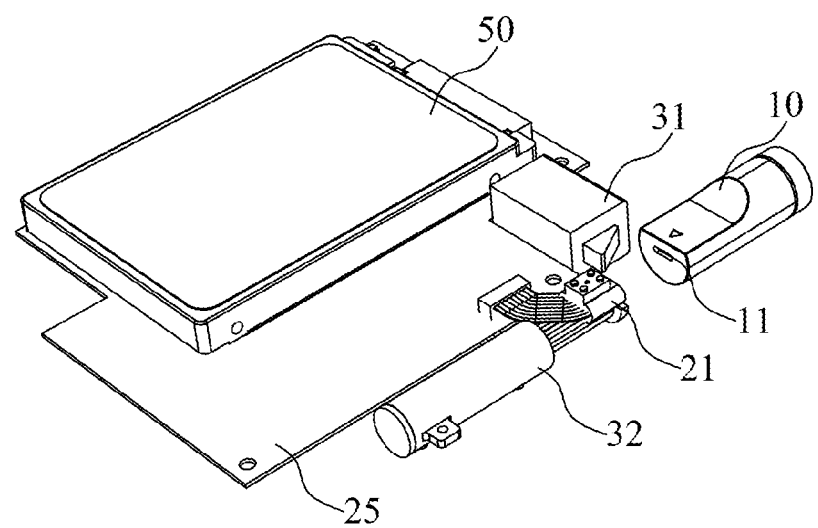
FIG. 2b is the first schematic view of using a dedicated storage module in a data retention device in a preferred embodiment.

Referring to FIGS. 2a and 2b, which illustrate the lock fastener module (30) comprising a locking element (31), a power element (32) and a fingerprint switch (33) wherein the locking element (31) is driven and shifted to another position by the power element (32) energized from the power source component (24).

In detail, the locking element (31) designed at one side of the dedicated storage module (10) (FIG. 2b) and used to fix the dedicated storage module (10) at a designated position is conductive to stability between the data plug (11) and the data socket (21); the power element (32) functioning as an electric motor is an electric device transforming electric energy to mechanical energy and further kinetic energy driving an external component or the dedicated storage module (10); the fingerprint switch (33) with the dual function of fingerprint recognition and power switch extracts an fingerprint image, ensuring connection of power with the power source component (24) activated by a fingerprint.

Preferably, a power receiving port (not shown in figures) in the locking hole (12) and a power supply port (not shown in figures) in the locking element (31) are electrically connected to each other for supply of electric power to the dedicated storage module (10) which is uneasily energized by itself.

Moreover, the encryption module (20) comprises an indicator (26) which displays corresponding operation status of a data retention device.

Furthermore, the encryption component (23) allows an encrypted key to be defined through the fingerprint switch (33) such that classified information is not accessed from the dedicated storage module (10) without a corresponding fingerprint.

Additionally, a data retention device further comprises an ordinary storage device (50) electrically connected to the encryption module (20) for secondary security of files.

Figure 2C:
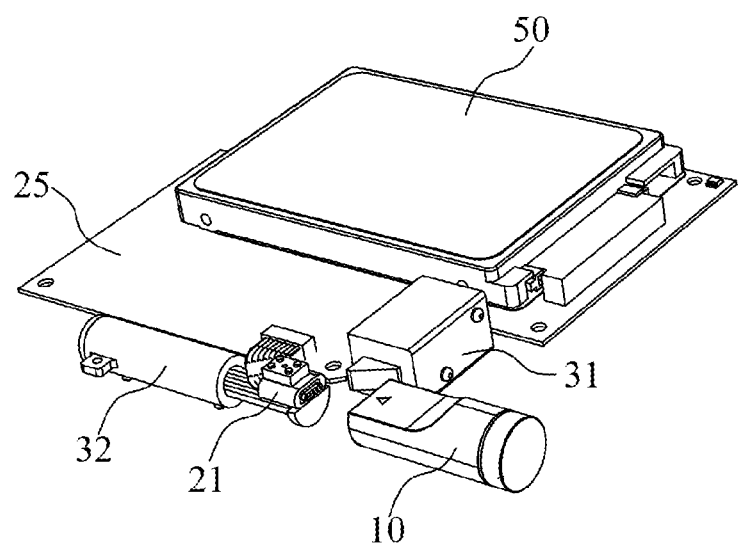
FIG. 2c is the second schematic view of using a dedicated storage module in a data retention device in a preferred embodiment.
Figure 2D:
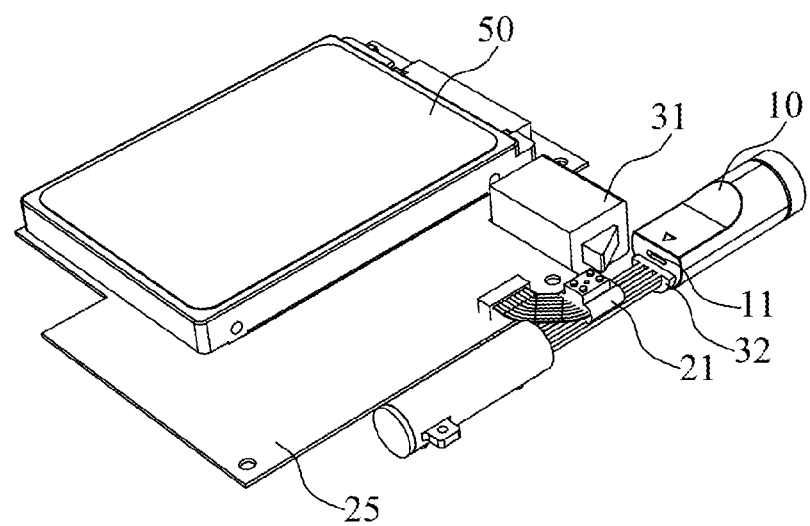
FIG. 2d is the third schematic view of using a dedicated storage module in a data retention device in a preferred embodiment.
Figure 2E:
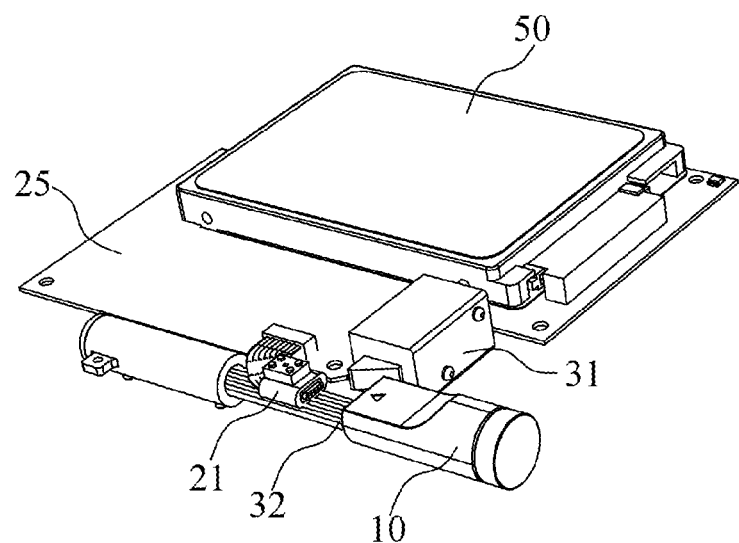
FIG. 2e is the fourth schematic view of using a dedicated storage module in a data retention device in a preferred embodiment.

Referring to FIGS. 2b and 2c, which illustrate changes in use between the dedicated storage module (10) and the encryption module (20): the dedicated storage module (10) is plugged into the encryption module (20) such that both the data plug (11) and the data socket (21) are shifted synchronously; the data plug (11) and the data socket (21) contact each other (not shown in figures), enabling the locking element (31) to be fixed at the locking hole (12) for stability between the data plug (11) and the data socket (21); a user triggers the locking element (31) to be released from the locking hole (12), detaching the dedicated storage module (10) by the power element (32) for separation between the data plug (11) and data socket (21) and removal of the dedicated storage module (10), as shown in FIGS. 2c and 2d.

For better protection, a data retention device further comprises an upper cover (51), a lower cover (52) and a fastener module (53) which comprises at least a footing section (531), a base section (532), a spring (533) and a locator subassembly (534).

Preferably, the lower cover (52) comprises a cooling fin unit (521) for better stability of the encryption component (23) at an encryption step; furthermore, the fastener module (53) comprises an unlocking pin (535) through which the upper cover (51) and the lower cover (52) are disassembled for convenient replacement of the ordinary storage device (50) by a user.

Figure 3A:
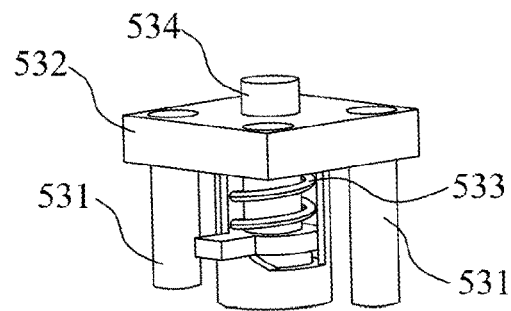
FIG. 3a is the first schematic view of using a fastener module in a data retention device in a preferred embodiment.
Figure 3A:
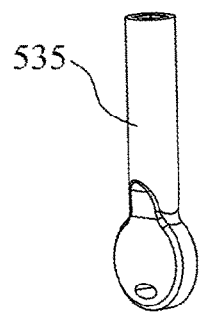
Figure 3B:
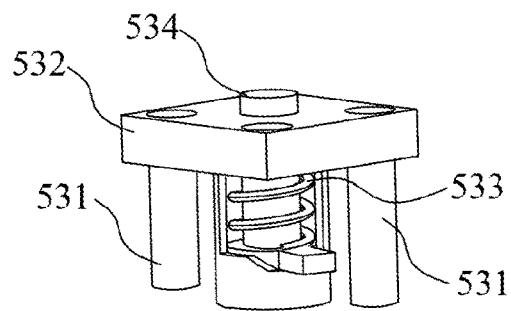
FIG. 3b is the second schematic view of using a fastener module in a data retention device in a preferred embodiment.
Figure 3B:
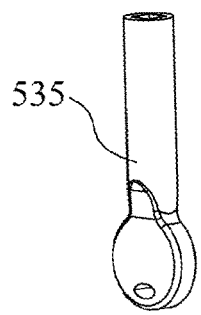
Figure 3C:
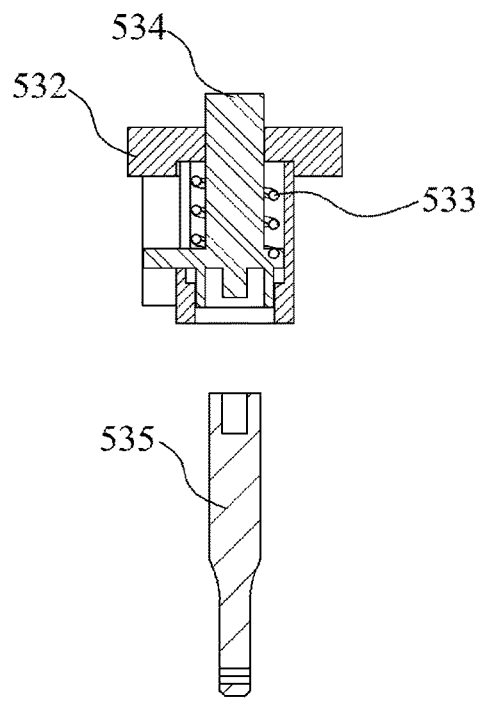
FIG. 3c is a schematic cross-sectional view of a fastener module in a data retention device in a preferred embodiment.
Figure 4:
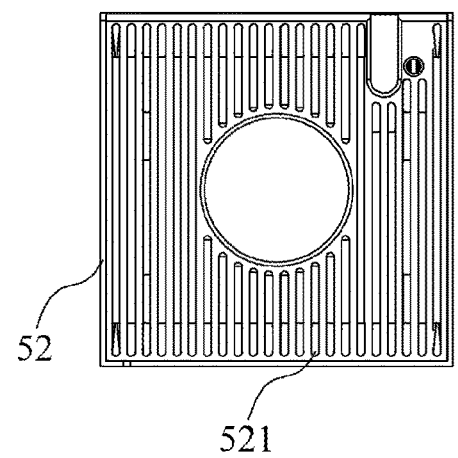
FIG. 4 is a schematic view of a cooling fin unit in a data retention device in a preferred embodiment.

In a data retention device, both the upper cover (51) and the lower cover (52) function as protective shields. Referring to FIG. 2a, which illustrates the fastener module (53) securely fastens both the upper cover (51) and the lower cover (52). Referring to FIGS. 3a and 3c, which illustrate the raised locator subassembly (534) locks the upper cover (51), the footing sections (531) are fixed on the lower cover (52) and the locator subassembly (534) has a lateral protuberance structure abutting and locking a fixed structure of the base section (532). When the unlocking pin (535) is plugged into the locator subassembly (534) from a pin socket at the bottom as shown in FIG. 3c, the status in FIG. 3a is changed to FIG. 3b. As show in FIG. 3b, the locator subassembly (534) descends from a higher position and stays at unlocked status for releasing the upper cover (51), the footing sections (531) are fixed on the lower cover (52) and the lateral protuberance structure of the locator subassembly (534) is shifted to the fixed side of the base section (532).

A detailed process to operate a data retention device in the present disclosure is explained in the preferred embodiment as follows.

Referring to FIGS. 1b and 2a, which illustrate a data retention device shielded by the upper cover (51) and the lower cover (52). With power connected to the power source component (24) from an external power supply, the power source component (24) is activated through the fingerprint switch (33) such that the dedicated storage module (10), the encryption module (20) and the lock fastener module (30) are energized, as shown in the indicator (26) for running status.

When the data plug (11) is inserted into the data socket (21), both the data plug (11) and the data socket (21) are shifted synchronously, as shown in FIGS. 1b, 2b and 2c.

Moreover, the data plug (11) and the data socket (21) contacting each other (not shown in figures) activate the locking element (31) to be fixed inside the locking hole (12) for stability between the data plug (11) and the data socket (21). Meanwhile, a power receiving port (not shown in figures) in the locking hole (12) and a power supply port (not shown in figures) in the locking element (31) are electrically connected to each other for supply of electric power to the dedicated storage module (10), as shown in the indicator (26) for running status.

Figure 5C:
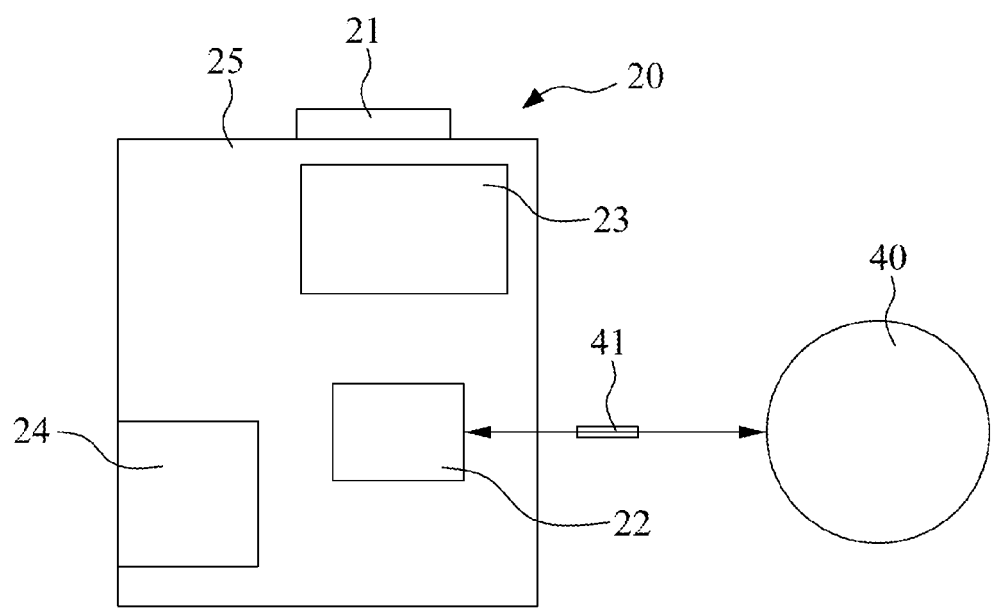
FIG. 5c is a schematic view which illustrates classified information is exchanged between an external device and an external component in a data retention device in a preferred embodiment.

Furthermore, as shown in FIG. 5c, the encryption module (20) is electrically connected to the dedicated storage module (10) through the data socket (21) and the external component (22) of the encryption module (20) is also electrically connected to the external device (40) for accessing classified information (41) which will be encrypted by the encryption component (23) and saved in the storage element (14), as shown in the indicator (26) for running status.

Finally, referring to FIGS. 2b and 2c, which illustrate a user triggers the locking element (31) to be released from the locking hole (12), detaching the dedicated storage module (10) by the power element (32) for separation between the data plug (11) and data socket (21) and removal of the dedicated storage module (10), as shown in FIGS. 2c and 2d.

Accordingly, a data detention device which is different from an ordinary data storage device and referred to as creative work in applications of private cloud meets patentability and is applied for the patent.

It should be reiterated that the above descriptions present the preferred embodiment, and any equivalent change in specifications, claims or drawings still belongs to the technical field within the present disclosure with reference to claims hereinafter.

What is claimed is:

1. A data retention device, comprising a dedicated storage module, an encryption module and a lock fastener module wherein: the dedicated storage module comprises a data plug, a locking hole, a control element, a storage element and a substrate which is electrically connected to all components in the dedicated storage module; the encryption module comprises a data socket, an external component, an encryption component, a power source component and a printed circuit board which is electrically connected to all components in the encryption module; the lock fastener module comprises a locking element, a power element and a fingerprint switch wherein the locking element is driven and shifted to another position by the power element energized from the power source component; a data retention device is characterized that: the power source component is activated by the fingerprint switch; the encryption module is electrically connected to the dedicated storage module through the data socket when the data plug is inserted into the data socket and the locking element is fixed at the locking hole; both the data plug and the data socket are shifted synchronously and the external component of the encryption module is electrically connected to an external device for accessing classified information which will be encrypted by the encryption component and saved in the storage element; and a power receiving port in the locking hole and a power supply port in the locking element are electrically connected to each other for supply of electric power to the dedicated storage module.

2. The data retention device as claimed in claim 1 wherein the encryption module comprises an indicator.

3. The data retention device as claimed in claim 1 wherein the encryption component encrypts a key through the fingerprint switch.

4. The data retention device as claimed in claim 1, comprising an ordinary storage device which is electrically connected to the encryption module.

5. The data retention device as claimed in claim 1, comprising an upper cover, a lower cover and a fastener module which comprises at least a footing section, a base section, a spring and a locator subassembly.

6. The data retention device as claimed in claim 5 wherein the lower cover comprises a cooling fin unit.

7. The data retention device as claimed in claim 5 wherein the fastener module comprises an unlocking pin.

* * * * *